(12) United States Patent
Wang et al.

(10) Patent No.: US 9,733,916 B2
(45) Date of Patent: Aug. 15, 2017

(54) LINKING CUSTOMIZED EXTERNAL WIDGETS TO DASHBOARD DATA

(71) Applicant: Business Objects Software Limited, Dublin (IE)

(72) Inventors: Fei Wang, Vancouver (CA); Geoffrey Neil Peters, Vancouver (CA); Michael Kerr, Vancouver (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 0 days.

(21) Appl. No.: 14/949,137

(22) Filed: Nov. 23, 2015

(65) Prior Publication Data

US 2017/0147308 A1    May 25, 2017

(51) Int. Cl.
*G06F 9/44* (2006.01)
*G06F 9/445* (2006.01)
*G06F 17/30* (2006.01)

(52) U.S. Cl.
CPC .............. *G06F 8/54* (2013.01); *G06F 8/65* (2013.01); *G06F 17/30882* (2013.01)

(58) Field of Classification Search
None
See application file for complete search history.

(56) References Cited

U.S. PATENT DOCUMENTS

| | | | |
|---|---|---|---|
| 6,370,681 B1 | 4/2002 | Dellarocas et al. | |
| 6,767,212 B2 * | 7/2004 | Thomas | G09B 23/28 434/219 |
| 7,406,510 B1 | 7/2008 | Feldman | |
| 7,587,570 B2 | 9/2009 | Sarkar et al. | |
| 7,660,843 B1 | 2/2010 | Atkinson et al. | |
| 7,702,655 B1 | 4/2010 | Panelli et al. | |
| 7,716,640 B2 | 5/2010 | Pik et al. | |

(Continued)

OTHER PUBLICATIONS

Atanu Banerjee, "Deploying Composite Applications in the Enterprise," retrieved from http://msdn.microsoft.com/en-us/library/bb220801(d=printer),aspx Article dated Dec. 2006.

(Continued)

*Primary Examiner* — Evral E Bodden
(74) *Attorney, Agent, or Firm* — Fountainhead Law Group P.C.

(57) ABSTRACT

Embodiments link external widgets to internal data displayed being within a dashboard as part of a story. An interface allows selecting external widget(s) based upon matching with a parameter of internal data being accessed. A user may define in an interactive manner, the behavior of the external widget in terms of characteristics such as data rendering, configurable fields, update behavior, and/or access to external sources (e.g., authentication). In an example, internal geographic dashboard data may serve as a basis for accessing external data such as social media data via a custom widget searching relevant messages combined with keywords (e.g., referring to geography). An external widget may be linked to other (internal/external) widgets through a linking table, such that changed/updated data is propagated for display within the dashboard. External widgets may thus be linked to data currently being viewed in terms of chart selection, data highlighting and data filtering mechanisms.

16 Claims, 12 Drawing Sheets

(56) References Cited

U.S. PATENT DOCUMENTS

| | | | |
|---|---|---|---|
| 7,827,527 B1 | 11/2010 | Chiluvuri | |
| 7,966,369 B1* | 6/2011 | Briere | G06Q 10/10 |
| | | | 707/616 |
| 8,037,471 B2 | 10/2011 | Keller et al. | |
| 2002/0054148 A1 | 5/2002 | Okada | |
| 2002/0072928 A1 | 6/2002 | Sundararajan | |
| 2003/0088545 A1* | 5/2003 | Subramaniam | G06F 17/30595 |
| 2004/0068553 A1 | 4/2004 | Davis et al. | |
| 2005/0262480 A1 | 11/2005 | Pik et al. | |
| 2006/0036993 A1 | 2/2006 | Buehler et al. | |
| 2006/0041890 A1 | 2/2006 | Pik et al. | |
| 2006/0106821 A1 | 5/2006 | Cox et al. | |
| 2006/0230396 A1 | 10/2006 | Martinez et al. | |
| 2006/0265719 A1 | 11/2006 | Astl et al. | |
| 2006/0277537 A1 | 12/2006 | Chan et al. | |
| 2007/0006149 A1 | 1/2007 | Resnick et al. | |
| 2007/0038934 A1 | 2/2007 | Fellman | |
| 2007/0094597 A1 | 4/2007 | Rostom | |
| 2007/0168925 A1 | 7/2007 | Bornhoevd et al. | |
| 2007/0180425 A1 | 8/2007 | Storms et al. | |
| 2007/0192695 A1 | 8/2007 | Grotjohn et al. | |
| 2007/0250492 A1 | 10/2007 | Angel et al. | |
| 2008/0033997 A1 | 2/2008 | Banker | |
| 2008/0040426 A1 | 2/2008 | Synstelien et al. | |
| 2008/0040681 A1 | 2/2008 | Synstelien et al. | |
| 2008/0046462 A1* | 2/2008 | Kaufman | G06F 17/30392 |
| 2008/0104611 A1 | 5/2008 | Kussmaul | |
| 2008/0120553 A1 | 5/2008 | Bergman et al. | |
| 2008/0120596 A1 | 5/2008 | Kothari et al. | |
| 2008/0141153 A1 | 6/2008 | Samson et al. | |
| 2008/0215998 A1 | 9/2008 | Moore et al. | |
| 2008/0222232 A1 | 9/2008 | Allen et al. | |
| 2008/0222606 A1 | 9/2008 | Solirov et al. | |
| 2008/0222621 A1 | 9/2008 | Knight et al. | |
| 2008/0222658 A1 | 9/2008 | Allen et al. | |
| 2008/0229280 A1 | 9/2008 | Stienhans | |
| 2011/0191303 A1* | 8/2011 | Kaufman | G06F 17/30286 |
| | | | 707/684 |

OTHER PUBLICATIONS

SAP AG Article, entitled "How to . . . Build a Collaboration Room Template", Enterprise Portal 6.0, Sep. 2003.

C. Coenraets et al., "Creating Next Generation SAP Analytics Applications with SAP NetWeaver and Macromedia Flex," dated Jun. 2005.

Tim Jennings and Rob Hailstone, "Developing Composite Applications," published Dec. 2006. White Paper, Sun Microsystems.

D. Ferguson and M. Stockton, "Enterprise Business Process Management—Architecture, Technology and Standards," (c) Springer-Verlag Berlin Heidelberg. pp. 1-15, 2006.

Hatscher, "SAP Design Guild Branding—From the Point of View of a Usability & Design Consultant," SAP AG, Feb. 21, 2003.

SAP, How-to Guide SAP NetWeaver 2004s, How to . . . Create a Room Template, Application Release, SAP NetWeaver, Mar. 2006.

C. Keyser, "Composite Applications: The New Paradigm," Microsoft, Dec. 2006.

M. McCormich, "Locking an iView in Place on a Page," Apr. 7, 2005.

Marco Ertei, "Model-driven development—simplicity to the max," 2005.

Vogel et al., "mySAP(tm) ERP for Dummies(R)," Sep. 30, 2005.

SAP, SAP NetWeaver Visual Composesr for SAP Enterprise Portal 6.0 User Guide, 2004.

S.Jones, "Portal content Development in the SAP NetWeaver Visual Composer," Jun. 3, 2005.

SAP iView Guidelines, Updated Edition, May 2002.

SAP, "SAP NetWeaver(TM) '04", Version 1.54, Jun. 1, 2005.

SAS(R) Information Delivery Portal, Release 1.1, SAP AG, 2003.

R. Westervelt, "SAP Explains Embedded Analytics," Jun. 16, 2005.

* cited by examiner

LINKING CUSTOMIZED EXTERNAL WIDGETS TO DASHBOARD DATA

BACKGROUND

Unless otherwise indicated herein, the approaches described in this section are not prior art to the claims in this application and are not admitted to be prior art by inclusion in this section.

Embodiments relate to providing data to computer software applications, and in particular, to methods and apparatuses linking customized external widgets to dashboard data. Specifically, computer software applications are traditionally created by programmers implementing certain functionality in specialized computer source code.

Over time, many types of computer applications have been created, and it has been desirable to allow various software applications to work together to implement more comprehensive functionality. However, for software applications to work together, yet more programming is required to create software frameworks that allow different software applications to communicate with each other and control the use of each application's functionality in a higher level process.

The programming necessary to compose different applications or other types of software components into customized applications with enhanced functionality can be time consuming and costly. Programming specialists are typically required, and complex specifications and architectures for tying software components together must be specified.

A software widget ("widget") is an application accessible by a user (e.g., via a desktop) that provides one or more particular functions. The usage of the term widget in this specification is to be distinguished from mere graphical components such as a button, cursor, or other virtual mechanisms used in a graphical user interface, because such virtual components are not applications by themselves and have no underlying processing algorithms or functionality.

Example widgets include clocks, calculators, calendars, desktop notes, etc. Widgets may be represented as icons on a computer display. The icons may be used to display information and provide input/output mechanisms for entering data and presenting the results. Widgets typically include one or more images that may be displayed on the GUI and may further include less than ten to several hundred lines of XML, JavaScript, or VBScript, or other programming languages, depending on complexity, to implement the widget's logic.

Again, however, the code of the widget allowing its integration with a particular platform, typically needs to be created. In particular, system administrators must typically define mappings between the various programs, applications, or other software components being accessed via a portal. Such mappings are typically created using metadata or metadata-like languages by a programmer or system administrator, and therefore suffer from similar cost, complexity, and time problems mentioned above. This can restrict the flexible implementation of a widget, limiting the types of information available to a user.

SUMMARY

Embodiments link external widgets to internal data being displayed within a dashboard as part of a story. An interface allows selecting external widget(s) based upon matching with a parameter of internal data being accessed. A user may define in an interactive manner, the behavior of the external widget in terms of characteristics such as data rendering, configurable fields, update behavior, and/or access to external sources (e.g., authentication). In an example, internal geographic dashboard data may serve as a basis for accessing external data such as social media data via a custom widget searching relevant messages combined with keywords (e.g., referring to geography). An external widget may be linked to other (internal/external) widgets through a linking table, such that changed/updated data is propagated for display within the dashboard. External widgets may thus be linked to data currently being viewed in terms of chart selection, data highlighting and data filtering mechanisms, and other possible mechanisms relating to the display of, and interaction with, the data.

An embodiment of a computer-implemented method comprises an engine receiving an input comprising a search parameter of an internal widget in communication with a database of an organization. The engine matches the search parameter with an Application Program Interface (API) connector of a first external widget in communication with a first outside data source. The engine offers the first external widget for selection to perform a search of the first outside data source. In response to selection of the first external widget, the engine receives data of the first outside data source from the first external widget based upon the search parameter. The engine stores the data in the database, and the engine renders the data in a visualization.

A non-transitory computer readable storage medium embodies a computer program for performing a method comprising an engine receiving an input comprising a search parameter of an internal widget in communication with a database of an organization. The engine matches the search parameter with an Application Program Interface (API) connector of a first external widget in communication with a first outside data source. The engine offers the first external widget for selection to perform a search of the first outside data source. In response to selection of the first external widget, the engine receives data of the first outside data source from the first external widget based upon the search parameter. The engine stores the data in the database. The engine communicates the data to an other widget identified in a linking table, and the engine renders the data in a visualization.

An embodiment of a computer system comprises one or more processors and a software program executable on said computer system. The software program is configured to cause an in-memory database engine to receive an input comprising a search parameter of an internal widget in communication with an in-memory database of an organization. The software program is configured to cause the in-memory database engine to match the search parameter with an Application Program Interface (API) connector of a first external widget in communication with a first outside data source. The software program is configured to cause the in-memory database engine to offer the first external widget for selection to perform a search of the first outside data source. In response to selection of the first external widget, the software program is configured to cause the in-memory database engine to receive data of the first outside data source from the first external widget based upon the search parameter. The software program is configured to cause the in-memory database engine to store the data in the in-memory database, and to render the data in a visualization.

Certain embodiments further comprise the engine receiving updated data of the external data source from the first external widget, the engine storing the updated data in the database, and the engine communicating the updated data to an other widget identified by a linking table.

In some embodiments the other widget comprises a second external widget in communication with a second outside data source.

In particular embodiments the updated data is received according to a schedule in the API connector.

Various embodiments further comprise the engine processing the data to produce modified data, the engine storing the modified data in the database, and the engine communicating the modified data back to the first outside data source.

Certain embodiments further comprise the engine communicating the modified data to an other widget identified by a linking table.

In some embodiments the first outside data source is accessible utilizing a security protocol, and a method further comprises the first external widget communicating a security parameter of the API connector to access the outside data source.

In particular embodiments the engine renders the visualization according to a rendering parameter in the API connector.

In specific embodiments the database comprises an in-memory database, and the engine comprises an in-memory database engine.

The following detailed description and accompanying drawings provide a better understanding of the nature and advantages of embodiments.

DETAILED DESCRIPTION

Figure 1:
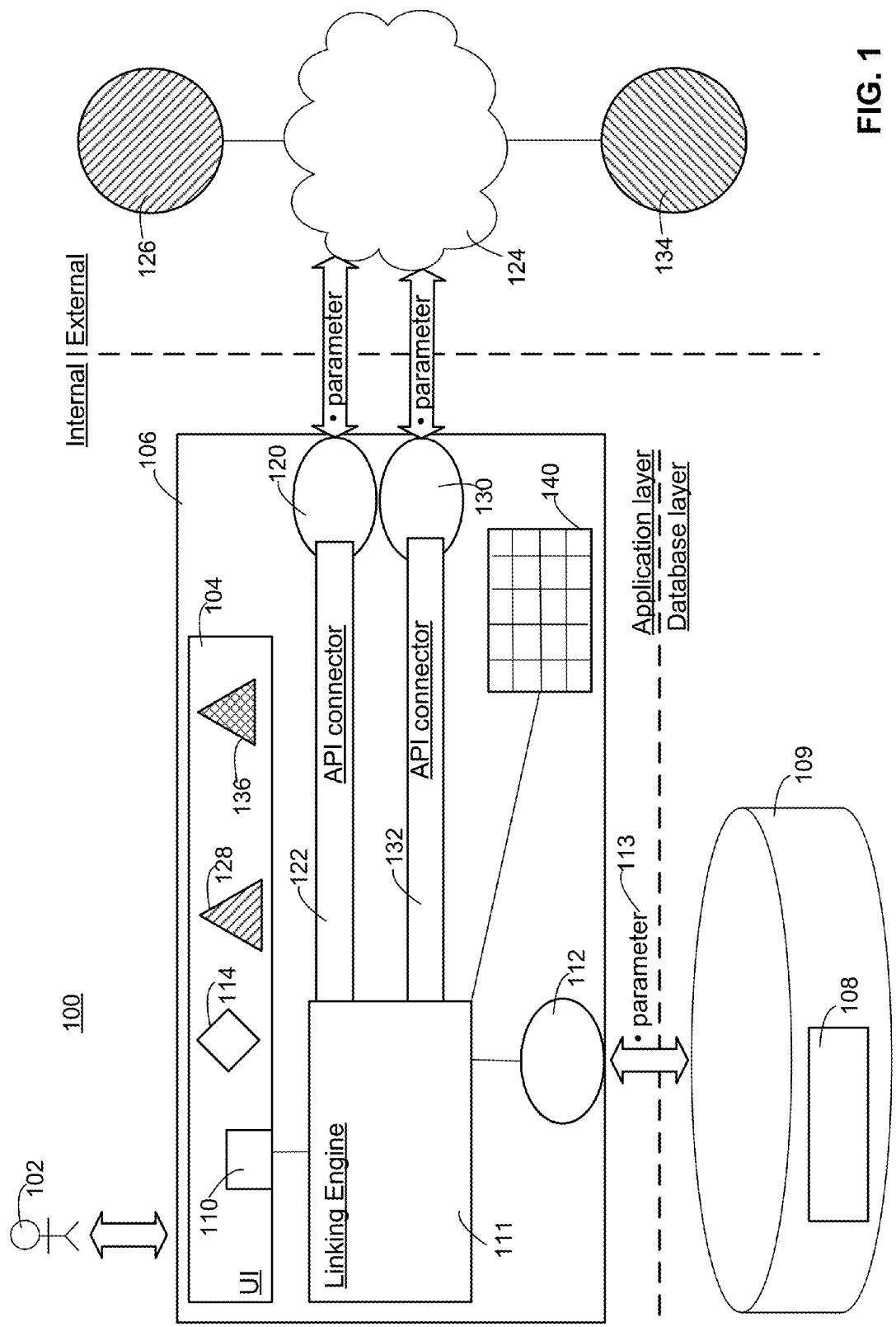
FIG. 1 shows a simplified block diagram of a system according to an embodiment.

Described herein are methods and apparatuses configured to link customized external widgets to dashboard data. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Databases and overlying applications referencing data stored therein, offer a powerful way of storing and analyzing complex related data. In particular, through the skillful presentation of data in the form of tables and charts, a user can describe complex issues and the factual and forecast data underlying those issues.

A particular application may access and store data available internally within an organization, utilizing one or more widgets specifically adapted to interact with a particular application. Accessing external data may be more problematic, particularly given ever-present concerns regarding security and security. Moreover, the various different forms and formats in which external data is available, may also call for specific methods and protocols in order to access that external data.

External data, however, may offer key problem-solving insights. For example, social media interaction presents a wealth of information regarding the actions and aspirations of third party individuals and organizations, often publicly available without restriction. Such social media content may thus assist in making business decisions. An external social media widget could allow a business user to collect customer feedback, and allow customer interaction such as responding to customer questions on those platforms.

Another example of the value of external data arises in the context of the Internet of Things (IoT), where everyday objects may be configured to provide data useful for collection and/or analysis. Thus a business user may also want to compare their company's performance with another company by using outside sources. A utility company could integrate real-world sensory data (weather forecast, climate sensors, etc.) through an external widget into their knowledge bases.

Typical challenges a business user may face when seeking to include/embed external sources with Business Intelligence (BI) currently being developed, include:

difficulty in linking or joining to an external database;

being unsure of the benefit or potential of a particular external data source (a need for better UI and metadata for discovery of external widgets);

a need for an indication of how much a user should trust an external data source; and how to locate/identify external data.

Accordingly, embodiments offer a way to add customized external widgets to a "story", where a story is a visual layout of information in various forms, including but not limited to text-based information, numerical information, images, videos, and other multimedia. Examples of story components can comprise internal data (e.g., chart or filter) as well as relevant data from outside sources obtained utilizing an external widget.

Embodiments thus propose an API (Applications Programming Interface) and a UI (User Interface) linking external widgets with existing data within a story or dashboard (that is, internal data). Embodiments may offer an extension model for adding custom widgets, and a UI to support selecting custom widgets and customizing their properties.

Embodiments provide for interaction between the external widgets and other visualizations within the story. Specifically, when the user changes the internal source, he or she may also want the external source to have been updated as well.

Using external widgets embedded in the story can allow for features such as near-real time refresh, to reflect the latest data. This may be helpful in bringing constantly changing real world information such as weather predictions, financial market information, news feeds, social media analytics, real-time customer feedback, or partner real-time supply chain data into the context of a particular story or dashboard.

The user may expect the content from the external source be coming from a live source or be based on static source, depending on the type of external source. The user would expect customizability when embedding external media content such as the ability to customize the content to match the internal content. One priority could be functionality-wise customization, and another could be a polished UI customization such as the ability to embed a company logo in the external widget content.

Embodiments provide an import data functionality allowing the user to bring the customized external data into a data analysis tool. The user can perform further manipulation, interact with other datasets, and create visualization based on the result. This feature collaborates and enhances the data acquisition framework by adding more types of supported data sources.

FIG. 1 presents a simplified view of a system 100 according to an embodiment. In particular, user 102 is in communication with interface 104 of application 106 present in an application layer.

The application is in turn in communication with internal data 108 stored within a data structure on a non-transitory computer readable storage medium 109 of an underlying database layer, e.g., a disk or Read Only Memory (RAM) in the case of an in-memory database. Here, the internal data may be business-focused, for example relating to sales.

Based upon user input to menu 110, engine 111 is configured to instruct an internal widget 112 to collect data from the database according to a particular parameter 113. In one specific example, the parameter could be a given time period (e.g., sales data over the calendar year 2013).

Based upon the internal data collected according to the parameter, the user interface is configured to display a corresponding visualization 114. Examples of such visualizations can include but are not limited to charts (e.g., bar, pie), plots, tables, and many others.

While the internal (e.g., business) data of the visualization 114 may be helpful, other information that is externally available may provide additional insight for analysis. Accordingly, the engine is further in communication with a first external widget 120 via first API connector 122.

The first external widget is configured to communicate via network 124 (e.g., the internet) with external data source 126. In one particular example, that external data source may supply weather information.

The API connector has stored thereon various functionalities relating to the first external widget. The role of the API connector is described in greater detail below.

Here, the API connector lists the various parameters serving as a basis for the first external widget to seek information from the outside sources. Here, the first external widget is configured to gather outside (weather) information based upon a time parameter.

The engine recognizes a match between the time parameter previously utilized by the internal widget, and the external widget's capability to also utilize a time parameter. Accordingly, the engine provides to the user interface, a menu option for the user to employ the first external widget to gather weather information.

Upon selecting the first external widget, it begins to function to collect external (weather) information. That external information is returned to the application, where the engine utilizes it as a basis for creating a new visualization 128 including weather information in addition to business information.

The application may further include a second external widget 130 and corresponding second API connector 132. That second external widget may be configured to communicate with a second external data source 134, such as a social network.

The second API connector also indicates the second external widget's capacity to collect data based upon a time parameter. Accordingly, a user may select the second external widget to harvest social media data from the outside source.

The engine may serve to further combine that social media data with the internal business data previously collected and/or the external weather data, in order to produce a third visualization 136. Together, the first, second, and third visualizations may form a cohesive story that aids in allowing a user and/or collaborators to appreciate and analyze related data in an intuitive manner.

Returning to the API connector, that element serves as bridge between the external widget and the engine. In addition to providing data harvesting functionality (e.g., according to specific parameters), the API connector may define other functionality of the external widget. Examples can include but are not limited to:

(1) data rendering properties;
(2) user configurable parameters;
(3) data refresh/updating frequency and/or directionality (e.g., uni- or bi-directional);
(4) details regarding access to external data sources (e.g., authentication).

Regarding data rendering, information with the API connector can specify how external data obtained by the widget, is in fact rendered within visualizations of the UI. It can identify relevant measure names and dimension names, and specify labeling features. The API connector can also determine how external harvested data is transformed by the engine prior to its rendering, for example converting a distance based upon GPS coordinates into a radius from a relative center point.

Regarding user configurable parameters, the API connector can allow various parameters (e.g., dimensions, geography, time) to be specified in order to collect the data from the external source. This allows a user to customize the widget to considerations such as the capabilities of the native application and the underlying database. A user can also configure a unique identifier for the external widget, which can serve as a basis for performing data updating and linking to other widgets.

Specifically, the API connector may specify a manner in which the external widget references the external source in order to obtain updated information. Such updating can take place according to a specified schedule, with frequent updating approaching near-real time accuracy).

The API connector may also specify a directionality of updating, for example uni-directional or bi-directional. For the latter, where changes are made to stored imported data, the external widget is configured to change the value in the source.

A widget identifier furnished by the API connector may also specify a linkage with other widgets. In particular, FIG. 1 shows the engine as being in communication with a linking table 140. That linking table may serve to propagate changes in data shared between a plurality of widgets (e.g., both internal and external).

Accordingly, where a refresh operation performed by the first external widget results in an updated value, the linking table may serve to cascade that change to other widgets according a ripple effect.

The linking table that is referenced as part of this data propagation process, may include as metadata fields:
parameters;
identifiers of linked widgets; and
data types.

Finally, the API connector may include information regarding access to specific external data sources. Such information can include user names, passwords, and encryption keys. As is now discussed in connection with FIG. 2, this information may be particularly valuable in connection with web-based applications.

Figure 2:
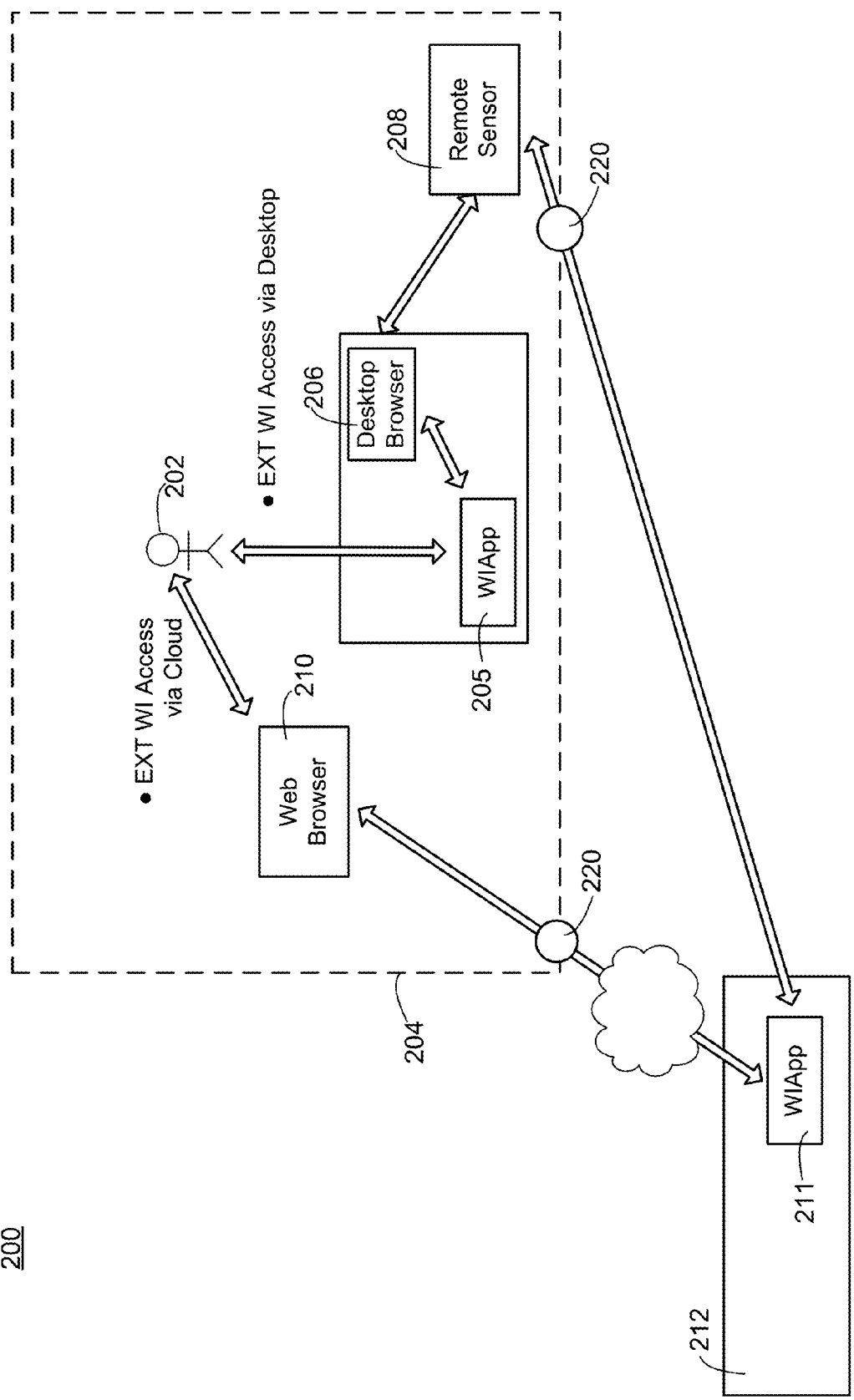
FIG. 2 is a simplified view contrasting access to external widgets via a desktop application versus via the cloud.

Specifically, FIG. 2 shows an environment 200 in which a user 202 belongs to an organization having an internal system enclosed within a security barrier 204 (e.g., firewall). In a desktop configuration, the user may access the application 205 including the external widget. This can result in the external widget reaching outside of the desktop via a browser 206 to access external data—for example from a remotely located sensor 208. In this desktop scenario, no additional security protocols are required because the remote sensor lies within the confines of the organization's firewall.

Alternatively, however, the user may seek cloud-based access. That is, the user interacts with a web browser 210 in order to communicate with the application 211 and external widget that are hosted on an outside server 212.

Here, a firewall now intervenes between the external widget and the information sought to be harvested by it. Thus, security information (e.g., user name, password) provided by the API connector, can afford the external widget access to the outside information, so that it can be returned to the application for visualization as part of a story presented at the user interface. Thus by passing user authentication information 220, external data can be returned to the application.

Figure 3:
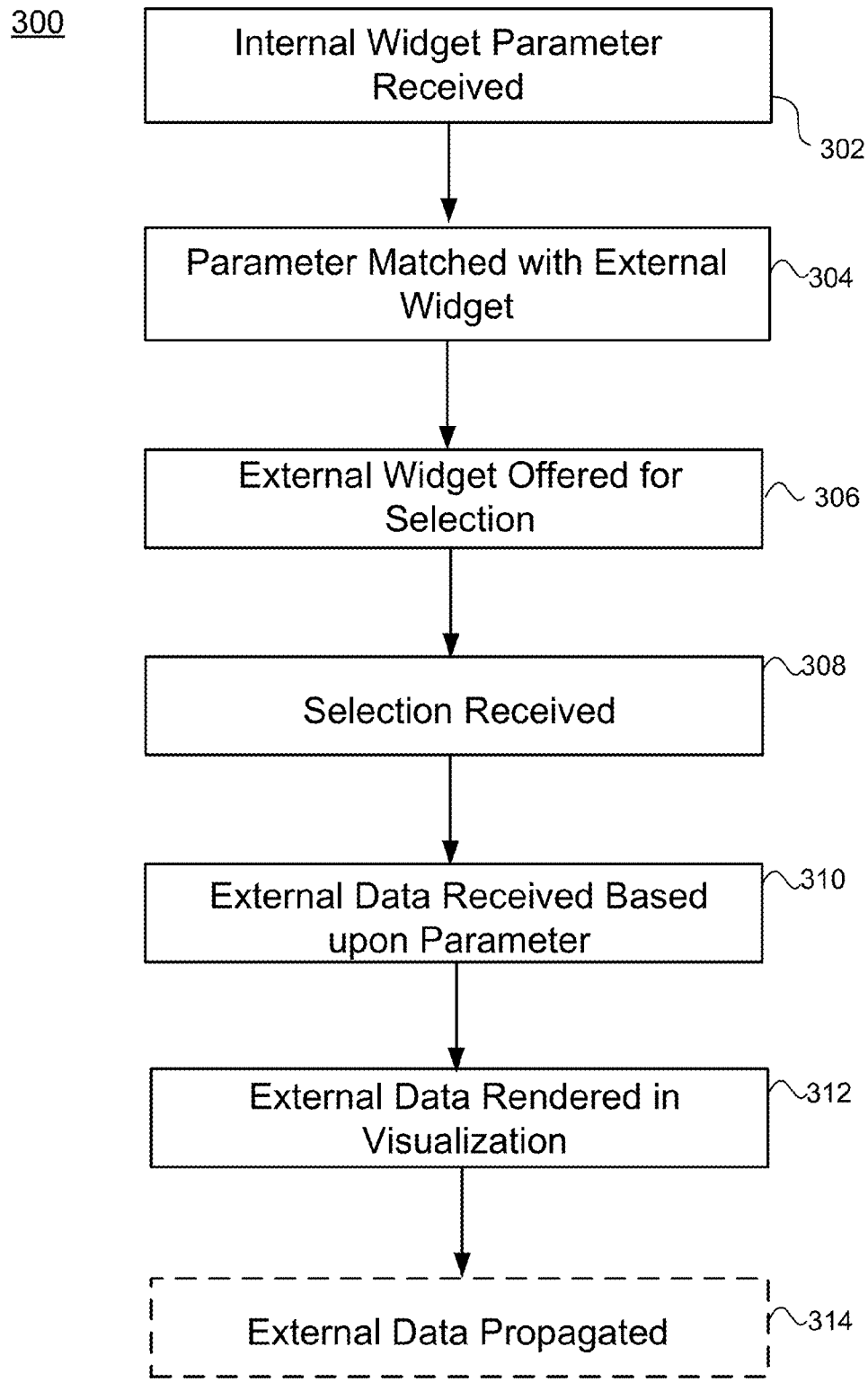
FIG. 3 shows a simplified flow diagram of a method according to an embodiment.

FIG. 3 is a simplified flow diagram showing a method 300 according to an embodiment. In a first step 302, a search parameter of an internal widget is received. That search parameter can specify a measure or dimension of data stored in an underlying database (which may be an in-memory database).

In a second step 304, the parameter is matched with parameters recognized by one or more external widgets having access to data from outside sources. In a third step 306, where matching is indicated, the external widgets are offered for selection by a user, e.g., in a menu of an interface screen.

In a fourth step 308, a selection of an external widget is received. That selection may take the form of a user clicking upon an icon presented in a selection panel of the interface screen.

In a fifth step 310, data from the outside source is received from the external widget based upon the parameter. That imported data may be stored in the underlying database, accessible for review and analysis.

In a sixth step 312, data from the outside source is rendered in a visualization presented to a user in the user interface. Rendering of the outside data may be performed according to a rendering parameter of an API connector to the external widget. Such a visualization can also include data received from the internal widget, as part of a cohesive storyline for analysis of database data.

In an optional seventh step 314, the external data may be propagated to other widgets (internal, external), potentially for use in collecting additional information and rendering that information as part of the story. Such data propagation may be accomplished with reference to a linking table containing an identifier of other widgets that are to receive the external data.

An example of a user workflow for UI interactivity within a story presentation relates to a visualization comprising a chart. First, the user may select or highlight a portion of the visualization. Next, a user may hit refresh button to bring in latest data update on the visualization. In response, the system provides a near-live time refresh. Alternatively, depending on the desired configuration, the refresh operation may occur automatically according to a particular schedule, without the need for a user to hit the refresh button.

As one or more dimension(s) used in the chart now have new values, queries will be fired with updated parameter values to those widgets linked to this dimension(s). This will result in widget charts re-rendering with new returned data, either from external data providers or internal data sources.

EXAMPLES

Specific examples are now provided in the context of accessing an external data widget in the context of the LUMIRA platform available from SAP SE of Walldorf, Germany. A user accesses the SAP LUMIRA platform in order to complete steps of data preparation, and to create visualizations of the data.

The API of these examples is based upon the LUMIRA extension model. That extension ecosystem allows for third parties to build custom widgets for purposes of data acquisition and visualization.

Figure 4:
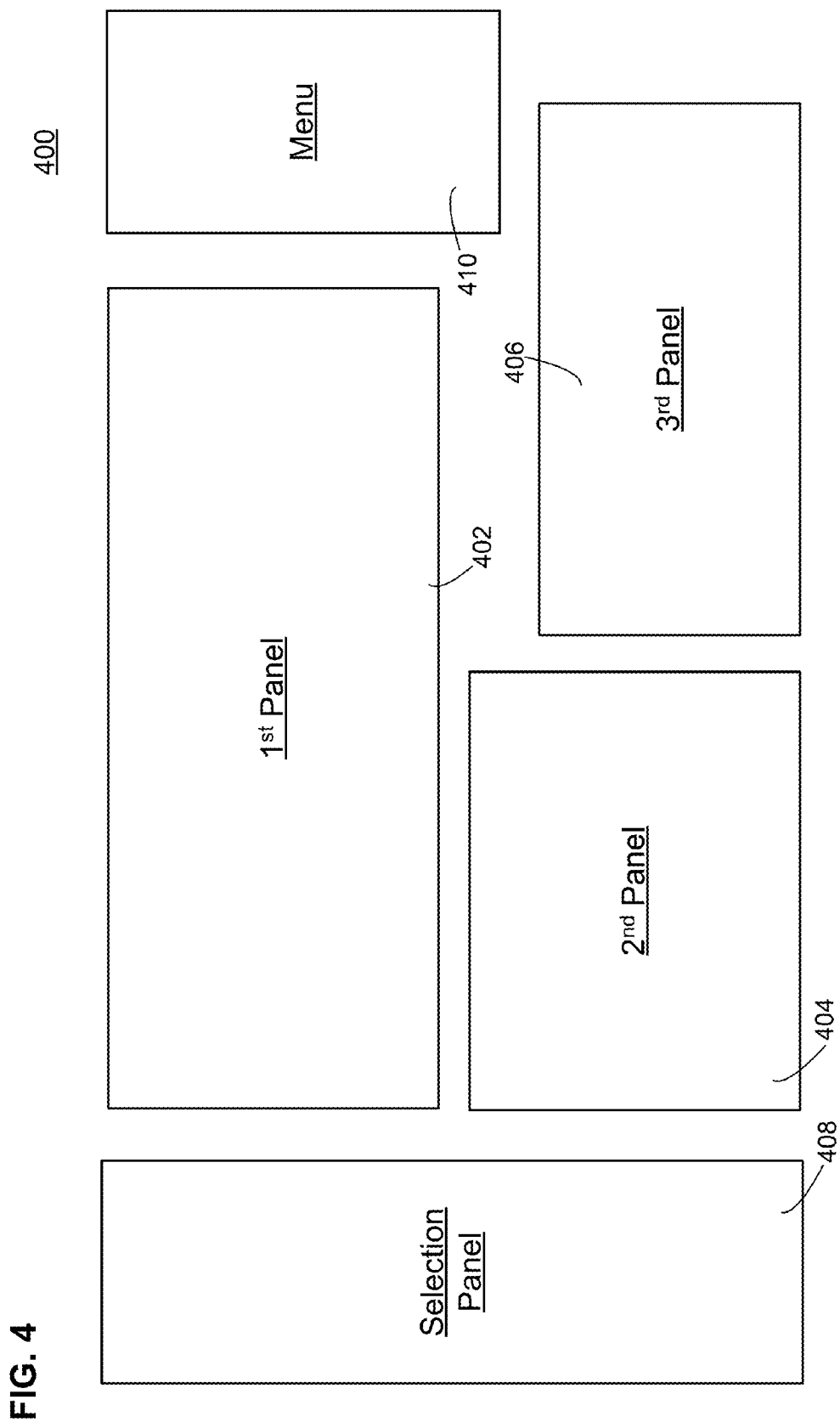
FIG. 4 shows a generic view of a user interface according to an example.

FIG. 4 shows a generic view of a dashboard providing visualization of data. The dashboard comprises a predefined layout template comprising a compose room 400 including three panels 402, 404, and 406, a widget picker (selection) panel 408, and a menu panel 410.

A widget picker is shown on the left panel of the compose room. Selecting the widget picker exposes a list of widget categories. Simply clicking on a category can reveal the installed widgets under the selected category. To add a widget to the dashboard, drag and drop it to a one of the panels on the dashboard. The widget picker also offers an option to install an external widget and assign it to an existing or new category.

Figure 4A:
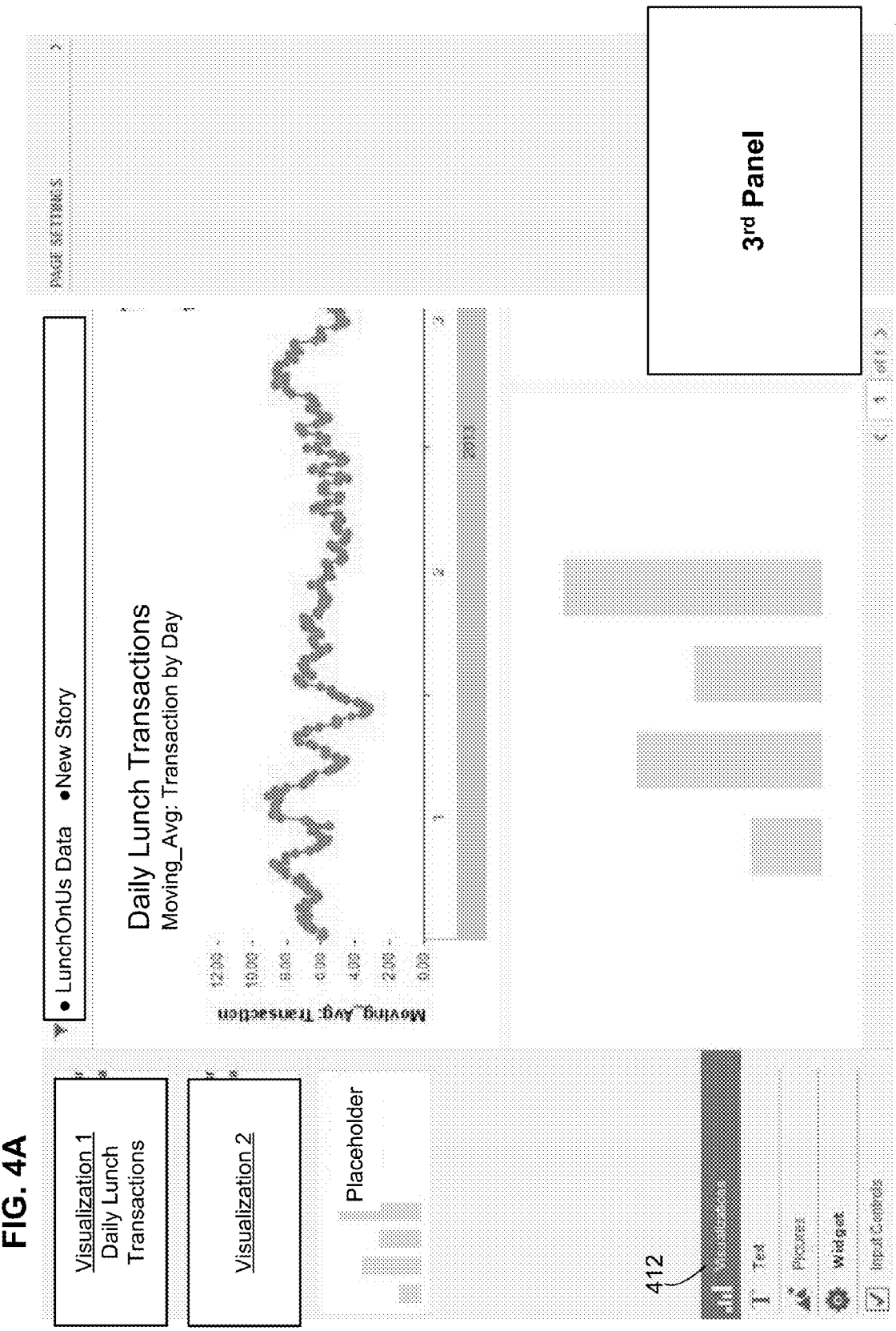
FIGS. 4A-F show sample user interface screen shots according to the example.

As shown in the screen shot of FIG. 4A, in this example visualization is of the "LunchOnUs" data story involving a user in Vancouver investigating lunch eateries. Initially, the user clicking upon the visualizations tab 412 results in the first panel displaying a "Lunch Transactions over Time" visualization based upon internal data.

Here, the visualization comprises a plot in the time dimension (quarters in the calendar year 2013). That represents a parameter which may be utilized in order to provide linkage to external widgets.

Accordingly, to assist the user in adding external data to complement that internal data, embodiments permit the interactive addition of customized external sources to the dashboard and the story being displayed thereon. A linking function is provided between the external widgets and internal underlying data being analyzed in the story.

FIGS. 4B-4E shows the next steps in the workflow of adding widgets. In particular, a selection panel offers the following external widgets for user selection:
i. weather widget (e.g., relevant to venturing outside for lunch);
ii. social media widget (e.g., TWITTER—relevant to potential eateries);
iii. other customizable widget.

Figure 4B:
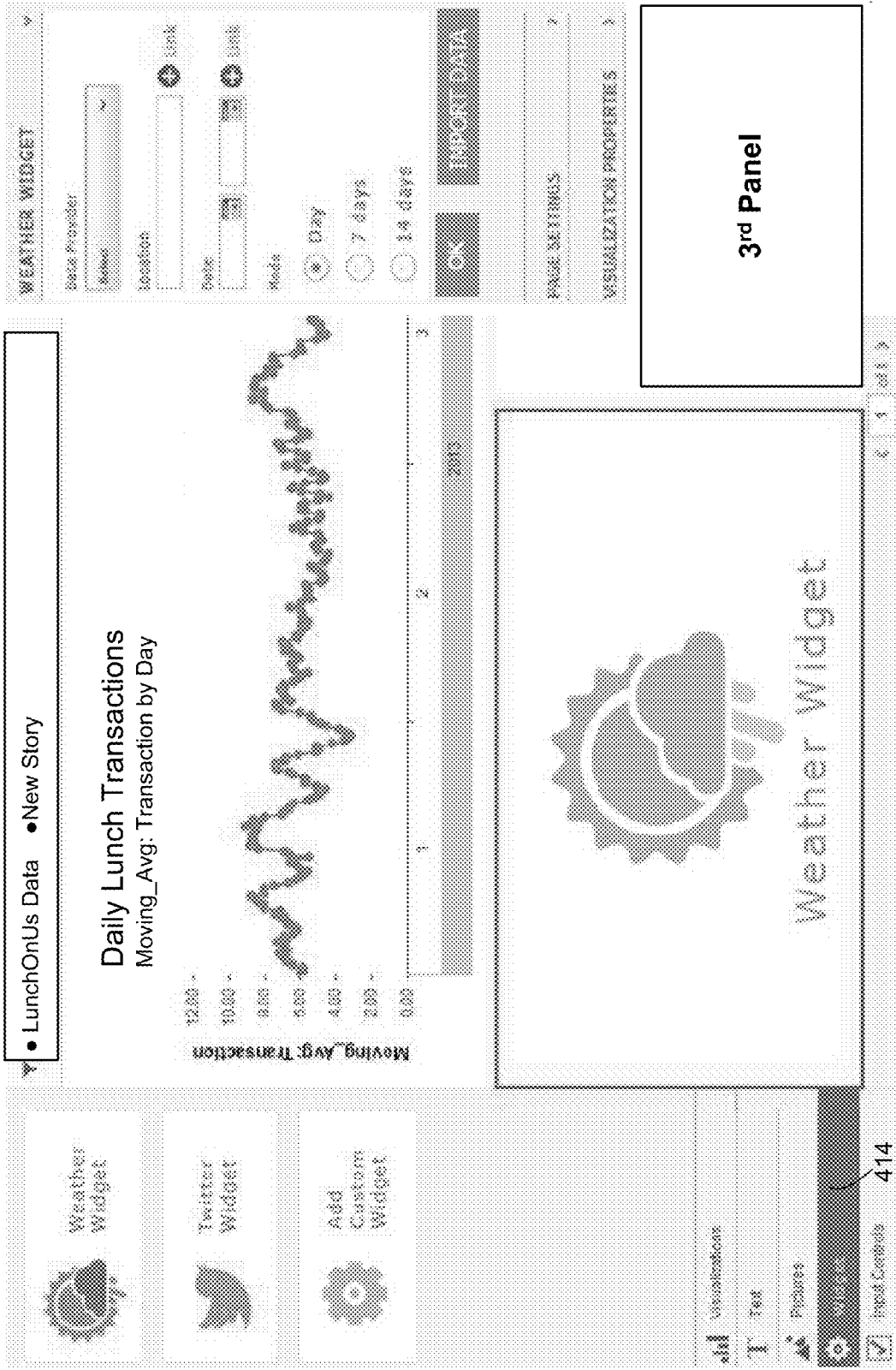

FIG. 4B shows addition of the weather widget to the dashboard and story being displayed thereon. Specifically, the user clicks upon the Widgets tab 414, and then drags and drops the weather widget to the second panel. That panel is inactive at this point in the workflow.

Figure 4C:
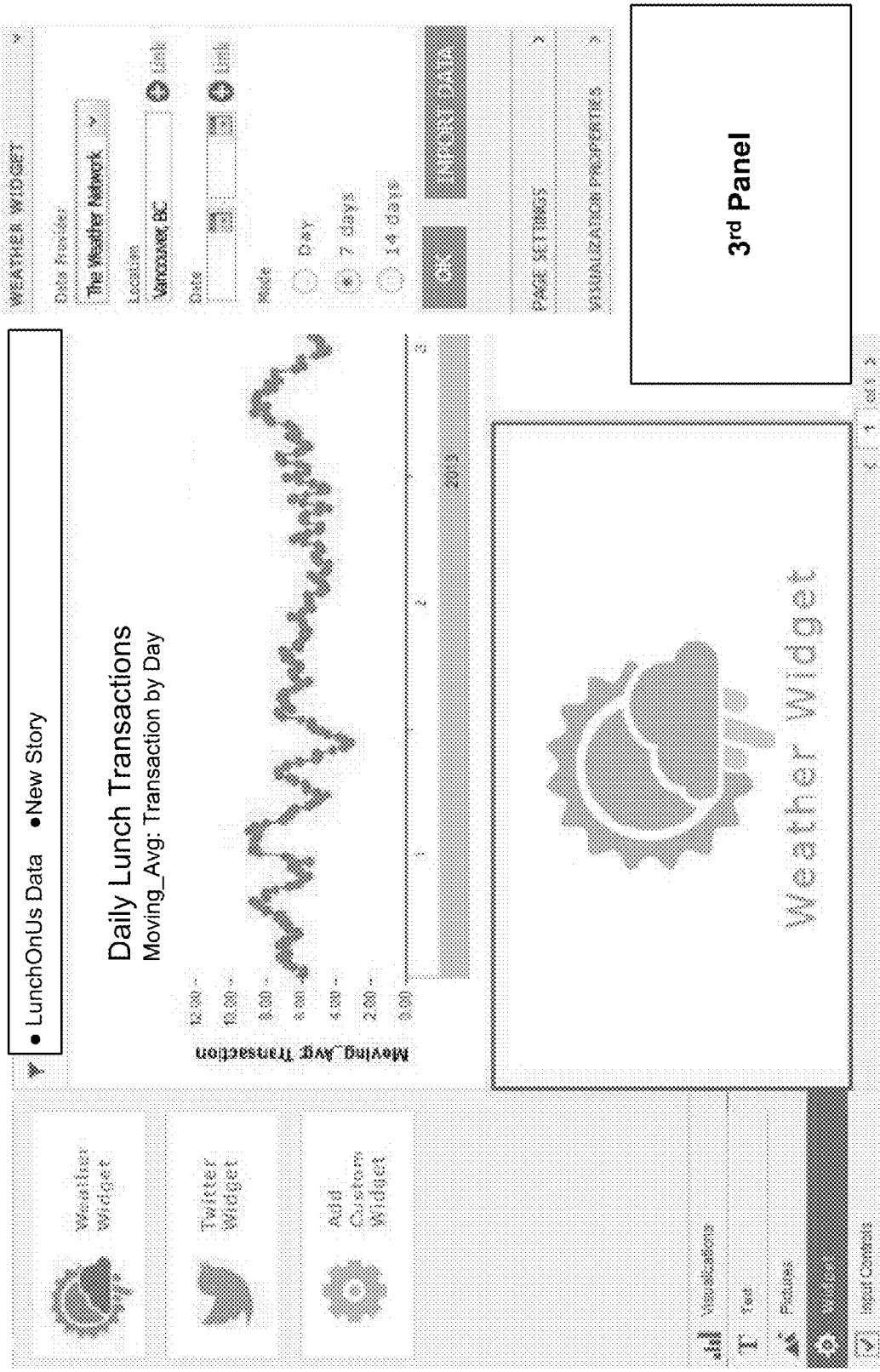

FIG. 4C shows the user accessing a menu panel in order to edit properties of this external weather widget that is being added. Specifically, the user may select a particular provider of external data ("The Weather Network") from a dropdown menu.

FIG. 4C further shows the user manually entering location information ("Vancouver"). Alternatively, input location may be provided via accessing a link (+). For inputting this location information via a link, a dimension may be selected by the user from a visualization or filter.

Figure 4D:
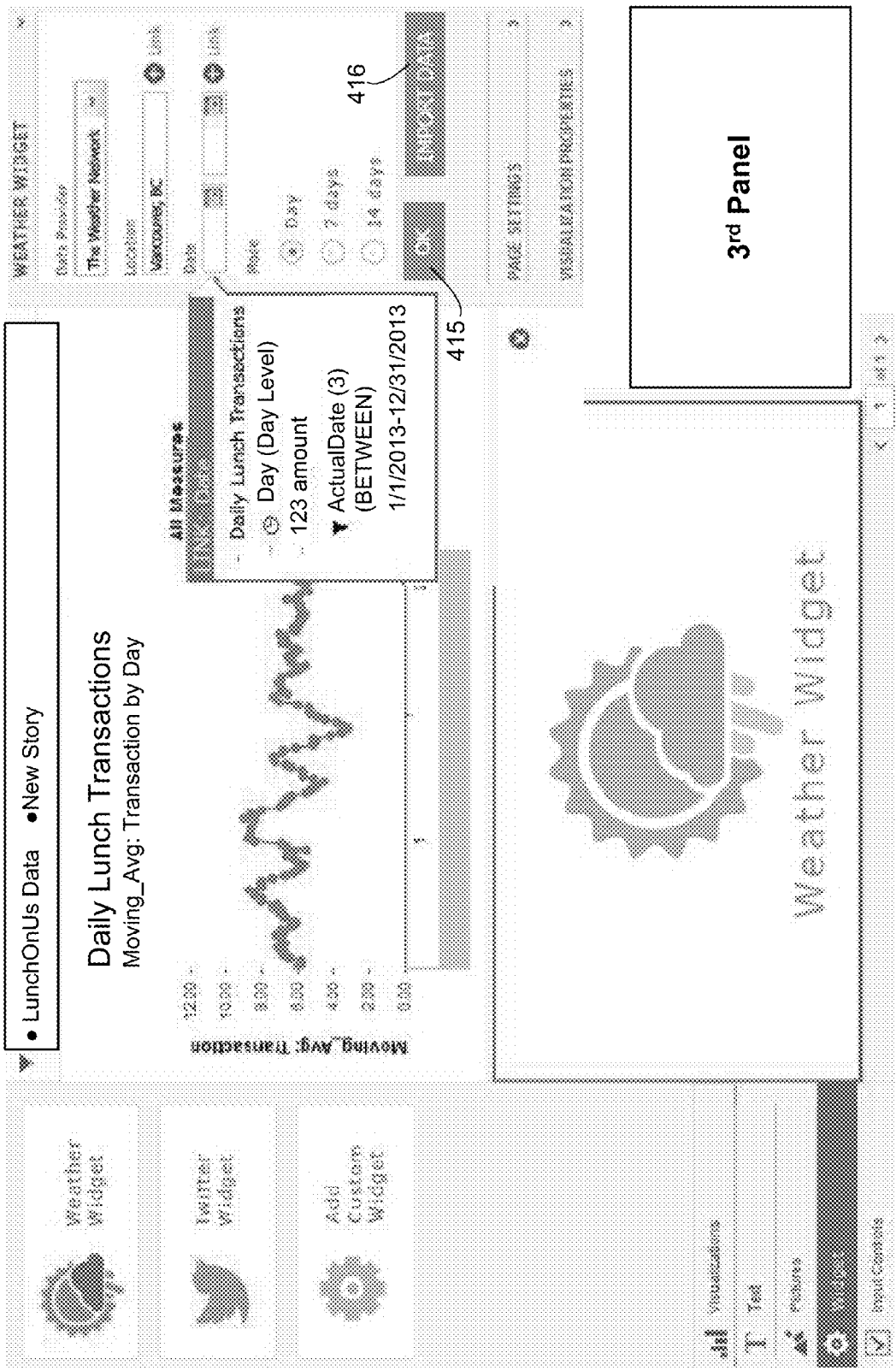

FIG. 4D goes on to show a user providing a further input to define a date (range) via a link. For the link, a dimension may be selected from a visualization or a filter. The link is provided in the form of a popup box.

Figure 4E:
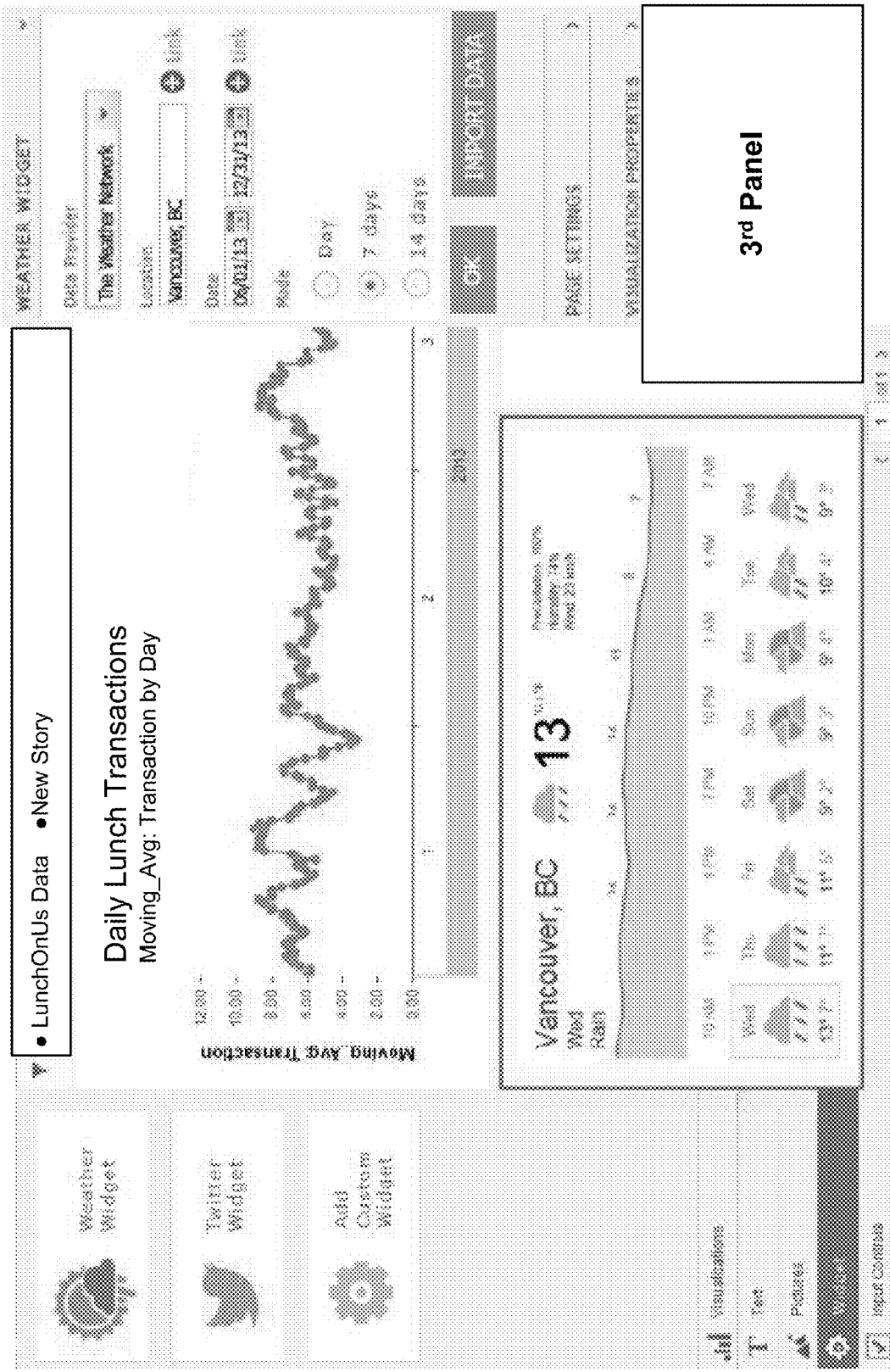

FIG. 4E shows the result of clicking upon the OK button 415. The weather panel of the external widget now becomes active. The weather information displayed within the panel may be historical, current conditions, or a forecast.

It is noted that the interface screen of FIG. 4E also includes an IMPORT DATA button 416. That IMPORT DATA button is used for bringing external data into the application, e.g., allowing for potential storage of screen shot data into an internal database.

Figure 4F:
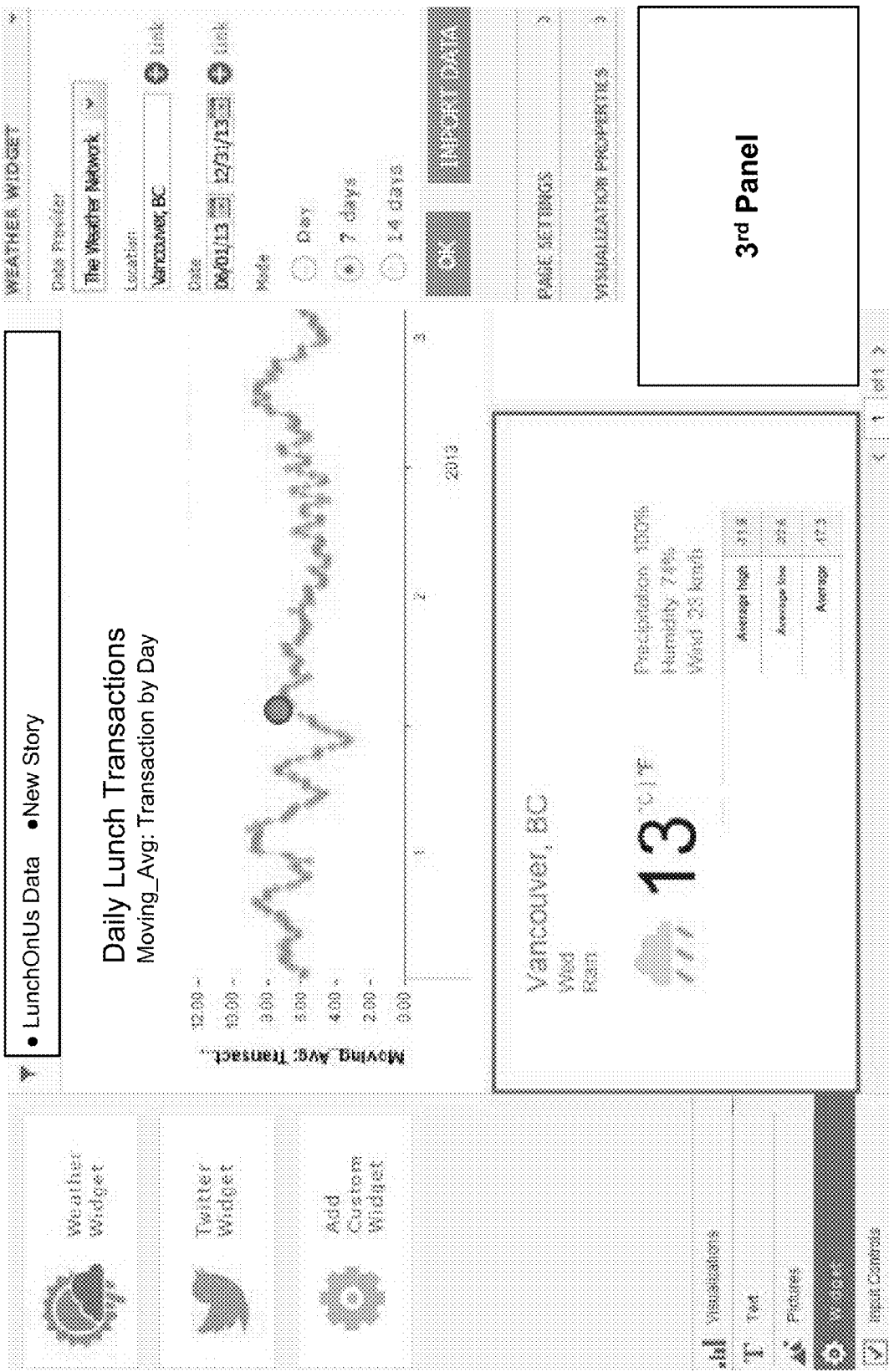

FIG. 4F shows the interactive nature of the external widget. That is, selecting a specific date on the widget results in additional specific information being provided (e.g., regarding precipitation, humidity, or wind).

As mentioned above, once added an external widget may be linked to other widgets. Thus based upon further input to the selection panel of Widgets tab in FIGS. 4B-4F, the user may drag and drop a TWITTER Widget to the $3^{rd}$ panel of the dashboard.

The $3^{rd}$ panel showing the external TWITTER widget is initially inactive, until properties are edited utilizing the menu. Such interactive editing may include logging on with TWITTER user and password.

The $3^{rd}$ panel then becomes active showing home tweets. A search term may be input manually or via a link. For the link, a dimension may be selected from a visualization or filter. Similarly, a date (range) may be input manually for via a link.

Further inputs to the TWITTER widget are possible. For example, as an option an advanced user may input custom (Uniform Resource Locator) URL parameters.

Based upon such inputs, the TWITTER external widget panel as well as other widgets, may be updated based on new parameters. For example selecting a date range to filter visualizations results in the feeds of the external weather and TWITTER widgets changing accordingly.

Still other examples illustrating linking of customized external widgets to dashboard data, are possible. One possible such use case is to investigate property rentals by factors such as location, neighbors utilizing geographical information supported by TWITTER.

There, the user needs to be able to enter search terms to further narrow down a quality of results. Thus a goal of a user may be to determine a number of rental properties as compared with housing prices based on geographical location. A high number of rentals may imply lower quality, with house prices indicated the quality of the houses in the neighborhood.

Sample query parameters for social media data provided by the external widget may include but are not limited to:
keyword (limit 10 keywords and operators);
time based series;
contains URL links;
'@' references a person from: to:;
positive or negative attitude;
does the tweet contain a question.

If the user's native, internal data included names of cities, but the external source used coordinates with a radius, then embodiments could provide for transforming from one data format to the other. For example:
Vancouver, BC=49° 15' 0" N, 123° 8' 0" W, 50 km OR
  49.2496600, −123.1193400, 25 mi
Thus in this "Places for rent" example: CSV Data (Internal Data)
  Address, City, Rent
  unit #4 113 main street, Vancouver, $1200.00
  111 17th street, Vancouver, $2400.00
  922 Argyle, North Vancouver, $3100.00
  119 grand boulevard, North Vancouver, $2100.00
According to the workflow, if the user clicks on Vancouver, then the external feed would use 'Vancouver' to narrow the results, linking this to external data:
http://feed.example.com/search/messages.json-
  ?geo=37.781157, −122.398720,50 km&keyword=north vancouver be hiking
  Data returned from such a query could be as follows:
  North Vancouver, Great hiking spot
  North Vancouver, I'll take everything! MMM build up an appetite from hiking
  North Vancouver, Hiking in the rain :)
  North Vancouver, Hiking in BC never fails to amaze. From Dep Cove to Lynn Canyon, would highly recommend
This data could also include pictures users have included of their hiking trip The examples just provided are given for purposes of illustration only, and embodiments are not limited to them. Thus while a "plus" icon is used above, a link icon could be provided instead for easier recognition by the user.

Also, in the pop out that occurs upon clicking the link icon, the a top label may be added to clearly indicate the linking. Alternative embodiments could expand the menu for selecting the widget instead of popping it up.

Embodiments could have different format or display modes for the widgets—e.g., a daily or weekly or monthly view of the weather; or a tweet listing or recent tweets, a summary of tweets over time, or a visualization style sparkline of tweet counts. Embodiments may allow multiple orientations of TWITTER widgets.

Color palette properties may be pre populated with story values/themes and allow customization. Other UI designs may be used for the linking, for example placing the linking directly into the properties panel instead of using a pop up. That may desirably serve to reduce a number of popups.

Some widgets may work better with certain story visualizations. So, embodiments may group widgets into different categories, and/or help users select widgets that would be most relevant. Such widget categorization can be based on geography or time, for example.

Options may be handled in various ways, for example refresh on open, saved data into widget or visualization. An API may be provided to save data from widget back into the LUMIRA lums file. Dynamic refreshing may be available as an option in certain embodiments.

For TWITTER, there may be an issue with the logon: is the user allowed to specify password for the report so the consumer never has to log on? Embodiments may prompt the users for the password and username. If a user does not have a TWITTER account, the widget could be blank or only previously—saved data may be shown.

Data Linking may be accomplished in various ways. Thus there may be a way to specify multiple cities, a range or a single value—for example a date range, the greatest date, or a single range or endpoint. Embodiments may allow specifying a single city or multiple cities or have control over how many cities are being selected. If a widget needs a particular number of values, there should be a smart way to choose how the values are selected from the available values (e.g. the top ones, the max, the first, etc). For dates, a date range or a single date may be specified and linked with the chart or filters. Or a single range may be specified and the current date or say "today".

In linking from a chart, if there is no data or no available dimensions or measures, the linking feature may be greyed out or an explanation message shown. Embodiments may bring the widget data back into the report to allow correlations with the data to be performed.

Other use cases are certainly possible. A retail example explores a store's location+time+weather correlations. Data could be used in calculations for correlation with weather forecast calculations.

Thus a TWITTER retail example for a clothing launch integrates tweets and TWITTER should provide metrics on the count of tweets the number of likes and retweets and a sparkline chart for tweet count (with product brand name and launch date). There could be the daily count of tweets for a search term over a launch.

There could be two different modes of the twitter widget. Tweets can chart popularity for example "Lululemon kids" where product brand name+launch date+activity correlates to launch.

Another example involving TWITTER could involve a utility company, where a power customer wants to keep track of the latest news about a large customer in order to help forecast demand for their power.

Alternatively, a power company may need to check their water levels and wind amounts. An external widget can be added for this purpose.

There are many other possible examples of various kinds of widgets. One widget may show a near-real time scrolling stock ticker showing current prices. Another could show an updating news feed with a Really Simple Syndication (RSS) external widget.

In summary, embodiments may offer one or more of the following:
a UI for discovery of external widgets that are available, and a method to add widgets to the story;
a UI for linking of data between external widgets and internal content, via a properties panel;
a UI function to take external data and bring it into the product so it can be used as internal data (such as importing this data back to the LUMIRA "prepare room");
an API specification for external widgets to integrate with the LUMIRA product's features to provide property editing/customization/data linking within the product depending on the intended purpose and needs of the external widget for user input and customization.

Embodiments may offer a method of UI interactivity within the story presentation itself, so that the chart can be used interactively and cause other parts of the story to change in complementary ways as the user interacts with the external widgets and the product's own internal widgets. For example, the external widgets may provide interactive features having cascading/propagating effects on the other components of the story and visualizations, working seamlessly with the other external/internal chart selection/highlighting and data filtering mechanisms. Essentially, interactive external widgets will interact with other parts of the story including other widgets and charts.

Embodiments may offer one or more benefits over conventional approaches. For example widgets may be integrated directly with the story composing feature of LUMIRA, and provide a unified way to work with any kind of external widget with any kind of content, not necessarily being a standard visualization or data source.

Internal widgets of LUMIRA and other data visualization/dashboarding tools, may be tied to a product "refresh" mechanism that follows the typical path of data acquisition, visualization creation, and then layout. In contrast, widgets according to embodiments may be used for real time updates, live streaming of text, images, video, etc. They are not bound by the traditional data lifecycle of the product, and the property editing API and feature can allow the user to interact with the widgets in ad-hoc ways.

An API specification for linking data to external sources may define one or more of the following behaviors:
changes in external data cause a query to be fired to the external source, causing the new data to be available within LUMIRA;
parameters passed from LUMIRA to the external source;
parameters of an external data source made available by the API, and the format of the data provided by the external data source API;
how to map data values to the external API parameters for the particular external source.

Returning to FIG. 1, while that figure shows the linking table being stored as part of the application layer, this is not required. In certain embodiments the linking table could be stored with internal and external data in an underlying database, e.g., an in-memory database.

And, while FIG. 1 shows the linking engine as part of an application layer overlying a database layer, this is not required. In certain embodiments, the linking engine may be implemented by a database engine, such as an in-memory database engine.

Figure 5:
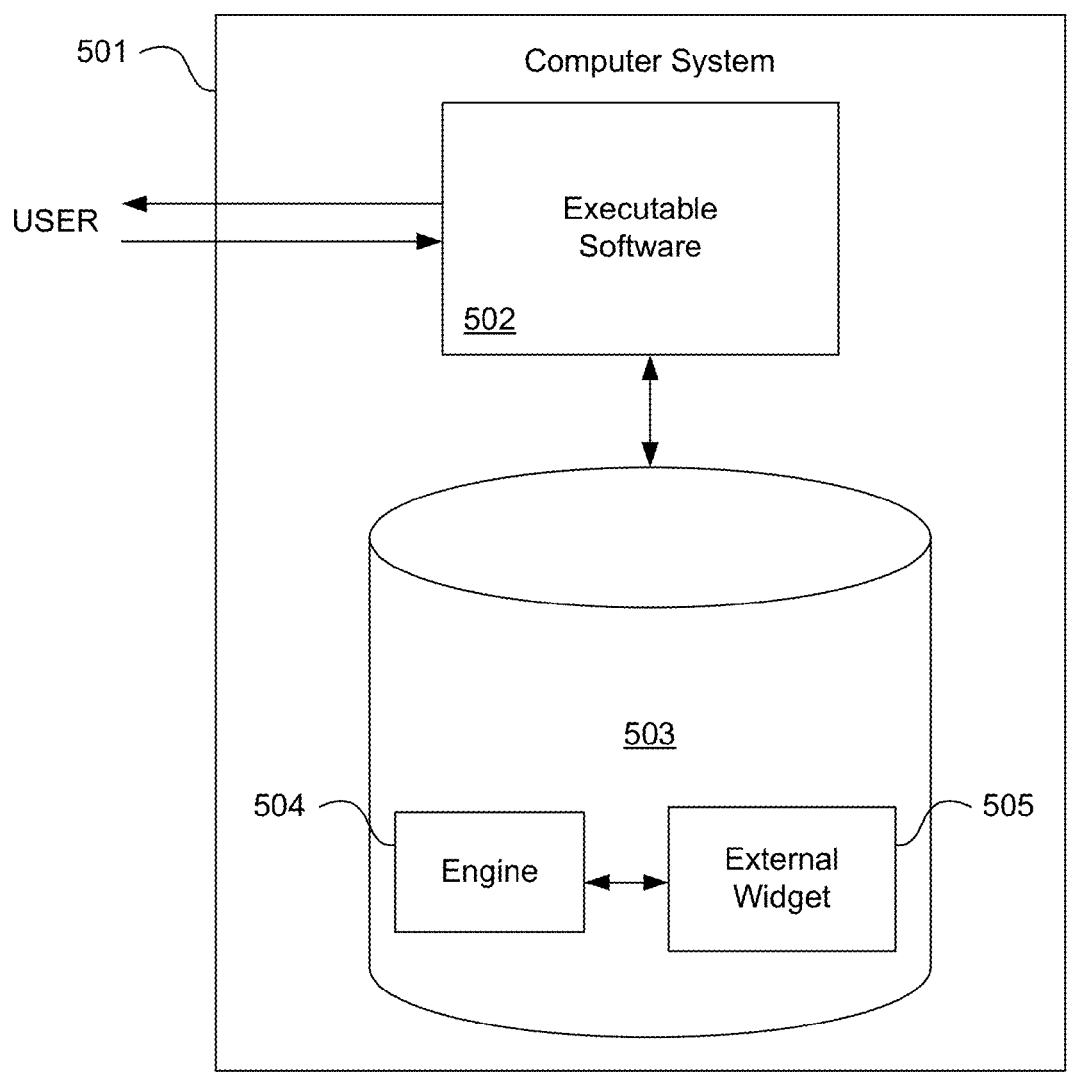
FIG. 5 illustrates hardware of a special purpose computing machine configured to linking customized external widgets to dashboard data according to an embodiment.

For example, FIG. 5 illustrates hardware of a special purpose computing machine configured to link customized external widgets to dashboard data according to an embodiment. In particular, computer system 501 comprises a processor 502 that is in electronic communication with a non-transitory computer-readable storage medium 503. This computer-readable storage medium has stored thereon code 505 corresponding to an external widget. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 6:
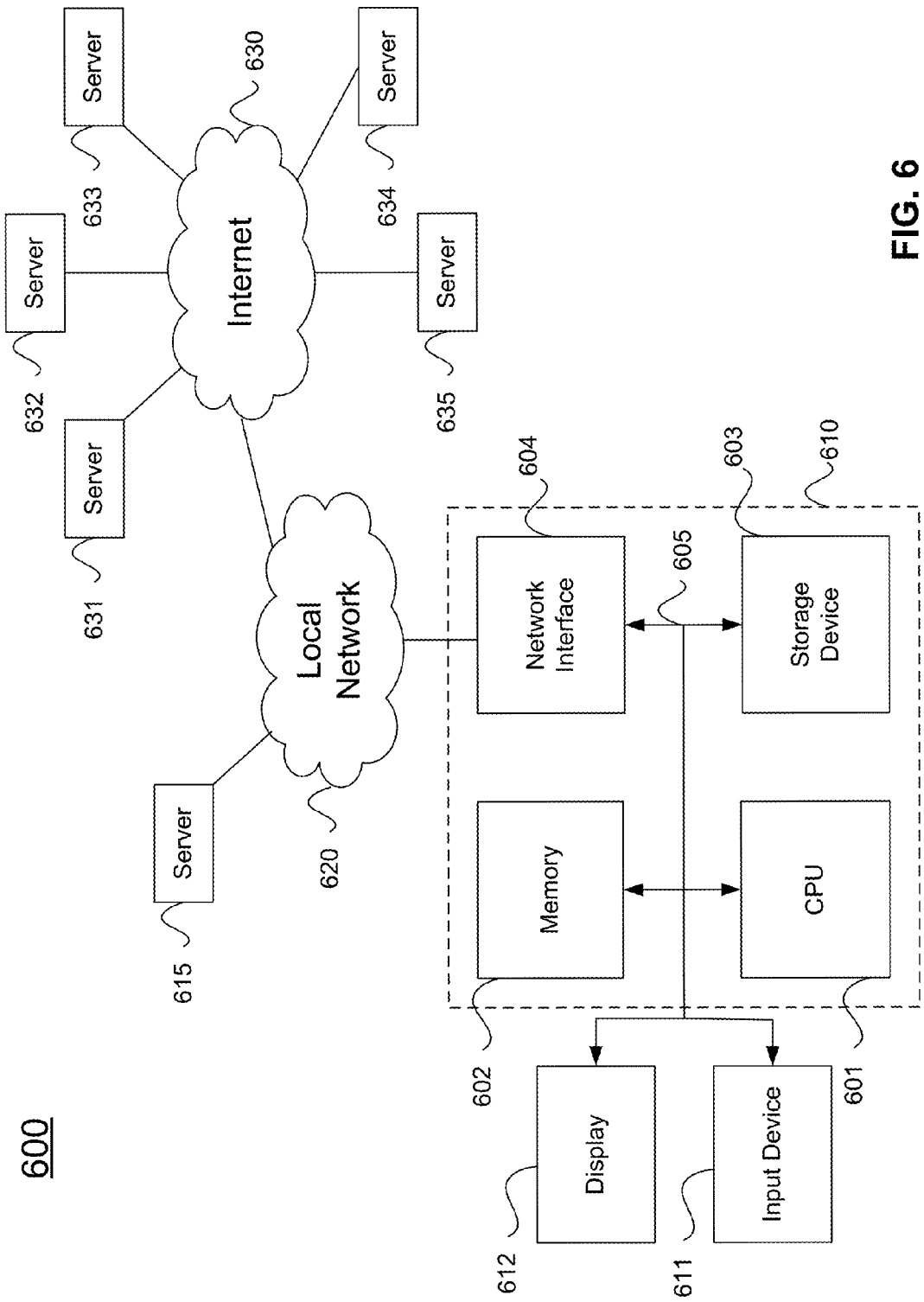
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   an engine receiving an input comprising a search parameter of an internal widget in communication with a database of an organization;
   the engine matching the search parameter with an Application Program Interface (API) connector of a first external widget in communication with a first outside data source accessible utilizing a security protocol;
   the engine offering the first external widget for selection to perform a search of the first outside data source;
   in response to selection of the first external widget, the engine receiving data of the first outside data source from the first external widget based upon the search parameter, the API connector specifying a uni-directional update functionality with the first outside data source;
   the engine storing the data in the database;
   the engine rendering the data in a visualization; and
   the method further comprising:
   the first external widget communicating a security parameter comprising an encryption key of the API connector to access the outside data source.

2. A method as in claim 1 further comprising:
   the engine receiving updated data of the external data source from the first external widget;
   the engine storing the updated data in the database; and
   the engine communicating the updated data to an other widget identified by a linking table.

3. A method as in claim 2 wherein the other widget comprises a second external widget in communication with a second outside data source.

4. A method as in claim 2 wherein the updated data is received according to a schedule in the API connector.

5. A method as in claim 1 further comprising:
   the engine communicating the modified data to an other widget identified by a linking table.

6. A method as in claim 1 wherein the engine renders the visualization according to a rendering parameter in the API connector.

7. A method as in claim 1 wherein:
   the database comprises an in-memory database; and
   the engine comprises an in-memory database engine.

8. A non-transitory computer readable storage medium embodying a computer program for performing a method, said method comprising:
   an engine receiving an input comprising a search parameter of an internal widget in communication with a database of an organization;
   the engine matching the search parameter with an Application Program Interface (API) connector of a first external widget in communication with a first outside data source accessible utilizing a security protocol;
   the engine offering the first external widget for selection to perform a search of the first outside data source;
   in response to selection of the first external widget, the engine receiving data of the first outside data source from the first external widget based upon the search parameter, the API connector specifying a uni-directional update functionality with the first outside data source;
   the engine storing the data in the database;

the engine communicating the data to an other widget identified in a linking table; and the engine rendering the data in a visualization;

the method further comprising:

the first external widget communicating a security parameter comprising an encryption key of the API connector to access the outside data source.

9. A non-transitory computer readable storage medium as in claim 8 wherein the other widget comprises a second external widget in communication with a second outside data source.

10. A non-transitory computer readable storage medium as in claim 8 wherein the method further comprises:

the engine receiving updated data of the external data source from the first external widget;

the engine storing the updated data in the database; and the engine communicating the updated data to the other widget.

11. A non-transitory computer readable storage medium as in claim 10 wherein the updated data is received according to a schedule in the API connector.

12. A non-transitory computer readable storage medium as in claim 8 wherein the engine renders the visualization according to a rendering parameter in the API connector.

13. A computer system comprising:

one or more processors;

a software program, executable on said computer system, the software program configured to cause an in-memory database engine to:

receive an input comprising a search parameter of an internal widget in communication with an in-memory database of an organization;

matching search parameter with an Application Program Interface (API) connector of a first external widget in communication with a first outside data source accessible utilizing a security protocol;

offer the first external widget for selection to perform a search of the first outside data source;

in response to selection of the first external widget, communicate a security parameter comprising an encryption key of the API connector to access the outside data source, the API connector specifying a uni-directional update functionality with the first outside data source;

receive data of the first outside data source from the first external widget based upon the search parameter;

store the data in the in-memory database; and render the data in a visualization.

14. A computer system as in claim 13 wherein the software is further configured to cause the engine to:

receive updated data of the external data source from the first external widget according to a schedule in the API connector;

store the updated data in the in-memory database;

communicate the updated data to an other widget identified in a linking table.

15. A computer system as in claim 13 wherein the software is further configured to cause the engine to:

process the data to produce modified data;

store the modified data in the in-memory database; and communicate the modified data to an other widget identified in a linking table.

16. A computer system as in claim 13 wherein the software is further configured to cause the engine to render the visualization according to a rendering parameter of the API connector.

* * * * *